US007788187B2

(12) United States Patent
Berger (10) Patent No.: US 7,788,187 B2
(45) Date of Patent: Aug. 31, 2010

(54) ABANDONED PROPERTY ESCHEAT ASSIGNMENT AND REPORTING SYSTEM

(76) Inventor: Thomas Berger, 19 Bluff Point Rd., Northport, NY (US) 11768

( * ) Notice: Subject to any disclaimer, the term of this patent is extended or adjusted under 35 U.S.C. 154(b) by 1542 days.

(21) Appl. No.: 10/672,493

(22) Filed: Sep. 26, 2003

(65) Prior Publication Data
US 2005/0071177 A1    Mar. 31, 2005

(51) Int. Cl.
*G06Q 50/00* (2006.01)
(52) U.S. Cl. .................................... 705/313
(58) Field of Classification Search ............ 705/1
See application file for complete search history.

(56) References Cited

U.S. PATENT DOCUMENTS

| 5,781,634 | A  | * | 7/1998 | Cordery et al. | 705/60 |
| 6,272,482 | B1 | * | 8/2001 | McKee et al. | 706/47 |
| 7,043,448 | B2 | * | 5/2006 | Campbell | 705/31 |
| 7,054,833 | B1 | * | 5/2006 | McDonald | 705/26 |
| 2002/0174017 | A1 | * | 11/2002 | Singh et al. | 705/19 |
| 2004/0243507 | A1 | * | 12/2004 | Deane et al. | 705/38 |
| 2006/0036407 | A1 | * | 2/2006 | Smith et al. | 702/188 |
| 2006/0224480 | A1 | * | 10/2006 | Bent et al. | 705/35 |

* cited by examiner

*Primary Examiner*—John G Weiss
*Assistant Examiner*—Vern Cumarasegaran
(74) *Attorney, Agent, or Firm*—Galgano & Associates, PLLC; Thomas M. Galgano; Thomas A. Gallagher (57) ABSTRACT

The methods of the invention include interrogating a user provided "Abandoned Property DataBase" (APDB) and assigning a probable escheat jurisdiction to each account based on a series of user-selected processing options. The invention appends confidence codes indicating how each escheat decision was reached, enabling users to make informed decisions as to which accounts require additional manual review and ultimately, which escheat to each jurisdiction. The invention can also correct addresses, parse extraneous data, append alternate escheat jurisdictions, provide Office of Foreign Asset Control (OFAC) compliance validation, and allow real-time review and updating of account data and escheat determinations. The invention will increase the likelihood of lost assets being reunited with their rightful owners and/or turned over to the proper jurisdiction.

36 Claims, 10 Drawing Sheets

ABANDONED PROPERTY ESCHEAT ASSIGNMENT AND REPORTING SYSTEM

BACKGROUND OF THE INVENTION

1. Field of the Invention

The invention relates to methods for increasing the likelihood of locating property owners and identifying the U.S. state, Canadian Province, or foreign jurisdiction of the property owner's last known address.

2. Brief Description of the Prior Art

Every U.S. state & select foreign countries have unclaimed property laws which declare property (including bank accounts and other financial accounts) to be abandoned after a period of inactivity typically in the three to five year range. During this abandonment period landlords, banks, utilities, hospitals, brokerage firms, mutual funds, insurance companies, and other organizations are required to use due diligence to attempt to locate the property owner. If the property owner cannot be located, then ownership of the property is transferred to the state or province's abandoned-property division or unclaimed property office, which in the context of this scenario is known as "escheat".

According to decisions of the United States Supreme Court, if the rightful owner cannot be located, the abandoned property must be returned to the state of the property owner's last known address. The business in custody of the property has an obligation to make a reasonable effort to identify the correct state of escheatment. Once all reasonable attempts are exhausted, if the address still cannot be identified, the property is returned to the state of incorporation of the business holding the property.

Surprisingly, satisfying reasonable due diligence requirements by identifying the appropriate escheat jurisdiction can be very difficult. A typical escheat process often requires extensive and redundant manual review of individual accounts by multiple parties, including, but not limited, to the organization holding the funds, their transfer agent, the unclaimed property clearinghouse and the individual state or provinces' unclaimed property departments, as well as a variety of attorneys, oversight committees, and vendors functioning in a subcontractor capacity. This process is made more difficult by jurisdiction filing deadlines which often do not allow for adequate time for the manual review process. This reduces the accuracy of the escheat and causes an unnecessarily large percentage of abandoned property to escheat to the state of incorporation of the property holder in error.

The escheat process can be especially challenging because of the age of many abandoned accounts and the poor condition of the account file. In the case of U.S. accounts, because many abandoned accounts were established so long ago, some actually pre-date the invention of zip codes. Additionally, many of the streets, towns and cities reflected in lapsed account owner files either no longer exist, or have had their physical boundaries redrawn. Even those accounts that were created more recently can cause problems as zip code changes occur to coincide with demographic trends, population growth and industry development. Confusion over the appropriate state abbreviation is also a problem. For example, it is not unusual for someone to incorrectly abbreviate Arizona as "AR", rather than "AZ". In actuality, "AR" is the abbreviation for Arkansas, which is often incorrectly abbreviated as "AK", the correct abbreviation for Alaska, which, in turn, is often misidentified as "AL", the correct abbreviation for Alabama. There is also routine confusion with abbreviations for all of the "M" states, and other states as well. These address errors render most data parsing tools ineffective. These challenges can often be even more difficult for foreign accounts, which have fewer addressing standards defined.

In addition to identifying the proper escheat jurisdiction, it is also important to be able to provide support documentation substantiating each escheat recommendation. As individual jurisdictions continue to follow the trend of enacting new legislation aimed at tightening guidelines, fewer and fewer organizations will be capable of satisfying the increasingly complicated due-diligence requirements.

SUMMARY OF THE INVENTION

It is therefore an object of the invention to provide automated methods for increasing the likelihood of locating property owners and, more specifically, identifying the U.S. state or appropriate foreign province or country of the property owner's last known address.

It is also an object of the invention to provide methods for improving the accuracy of the escheat process and to provide detailed documentation supporting escheat recommendations.

Accordingly, the methods of the invention include interrogating a user provided "Abandoned Property DataBase" (APDB) and assigning a probable escheat jurisdiction to each account based on a series of user-selected processing options. The invention appends confidence codes indicating how each escheat decision was reached, enabling users to make informed decisions as to which accounts require additional manual review and ultimately, which escheat to each state or foreign jurisdiction.

The invention also provides the user with the additional ability to interrogate each account owner record to isolate name and address attributes and correct misspelled or otherwise "bad" addresses, parse extraneous data, identify lapsed/retired city names, append probable zip/postal codes to otherwise unidentifiable accounts, and/or append a detail of all possible alternative escheat jurisdictions along with their corresponding zip/postal code counts for each identifiable city name. The city/state and zip code assignments can be further refined to be based upon the USPS' (P)referred Zip codes, (A)cceptable Alternative Zip codes, and/or recognized, but (N)on-Acceptable Alternatives from a delivery standpoint.

The invention further incorporates an Office of Foreign Assets Control (OFAC) compliance module that interrogates every character in each account owner record and scans for the presence of OFAC restricted foreign countries and/or terrorists, international narcotics traffickers, and those engaged in activities related to the proliferation of weapons of mass destruction.

After a database is processed through the invention, the resulting output file can be posted to a secure DataBase Management System (DBMS), which can be accessed through the Internet. Authorized users can access individual accounts for the purpose of reviewing, approving, or editing escheat determinations and related account data fields, as client defined permission levels allow. While reviewing accounts within the DBMS, authorized users can access electronic listings of city names and Zip/Postal codes within each jurisdiction to assist them in their review. Reviewed or edited account owner records are electronically flagged within the DBMS to indicate the user that conducted the review, the status of the review, and the edited escheat jurisdiction.

Detailed marketing and operational reports can be generated in real-time and, upon completion of each project, a comprehensive final output report package is generated along with individual reports for each jurisdiction, as an additional option.

The invention significantly improves the speed and accuracy of escheat decisions, while dramatically reducing unclassified accounts defaulting to the state of incorporation of the property holder. Collectively, the processing options and reports according to the invention are designed to satisfy due diligence requirements of each jurisdiction. The methods of the invention are performed with the aid of a computer and can be provided locally on an individual desktop computer or remotely via the Internet.

DETAILED DESCRIPTION

Figure 1:
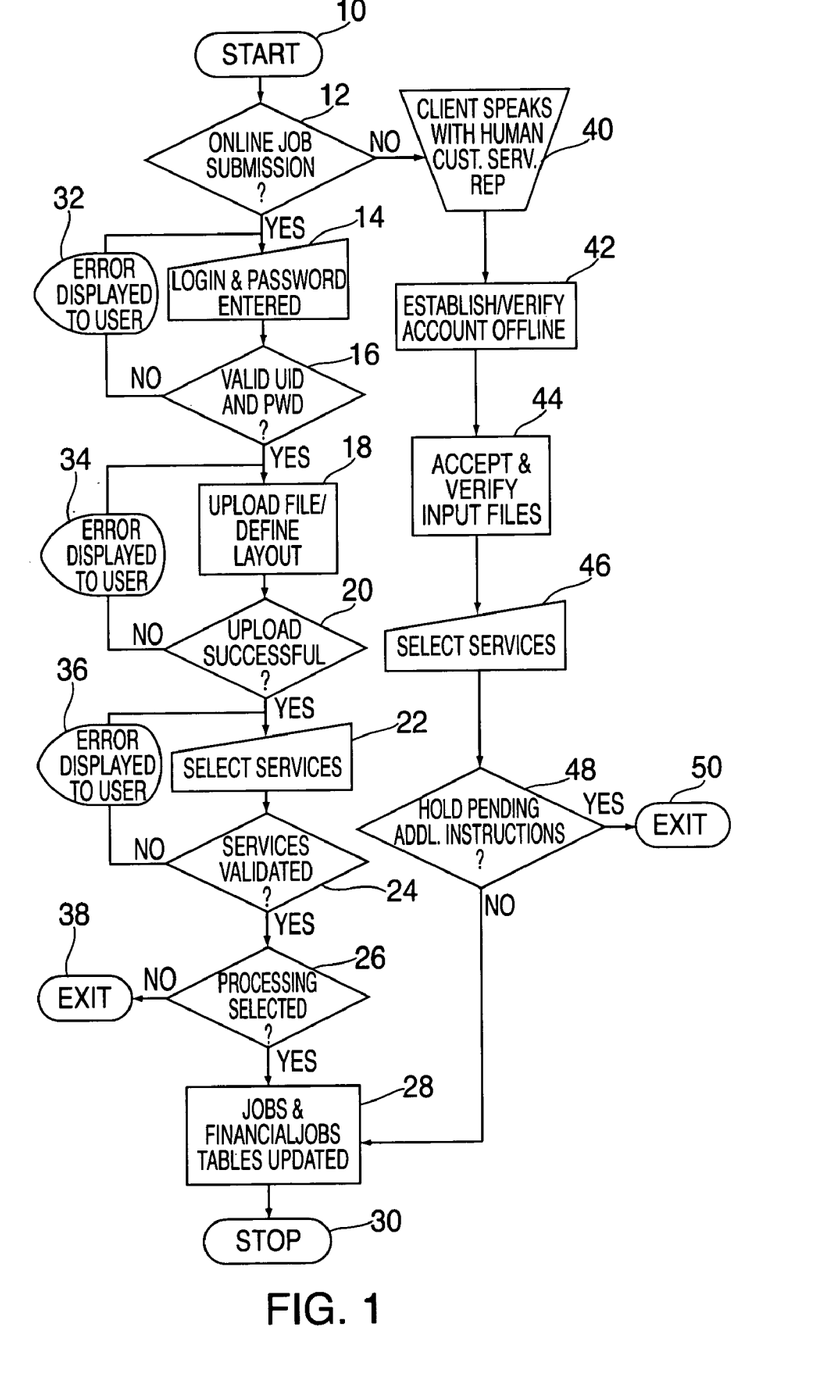
FIGS. 1-13 are flow charts illustrating an embodiment of the invention.

Turning now to FIG. 1, starting at 10 a decision is made at 12 whether to submit a job online or in person. If it is decided to submit online, the user enters name and password at 14 which are validated at 16. If validation fails, an error message is displayed at 32 and the user is given another opportunity to login. If login is successful, the user uploads a data file and defines its layout at 18. The upload is validated at 20. If the upload failed, an error is displayed at 34 and the user is given the opportunity to upload again. If the upload is successful, the user selects services at 22. The services are described in more detail with reference to FIGS. 2-13. The services are validated at 24 (e.g. determined whether the user has subscribed to the selected services). If a selected service is invalid, an error message is displayed at 36. If the selected services are valid, the user has the opportunity to decide at 26 whether to order processing. If processing is ordered, tables are updated at 28 and at 30 the job entry is complete and proceeds to processing at 52 in FIG. 2. If processing is not selected at 26, the program exits at 38.

If it was determined at 12 to submit the job in person, the client speaks with a service representative at 40. An account is established or verified at 42. Data input files are accepted and verified at 44 and services selected at 46. The customer may decide at 48 to defer processing pending further instructions, exiting at 50, or to proceed with processing, updating tables at 28 before exiting the job entry step at 30 and beginning the processing at 52 in FIG. 2.

Figure 2:
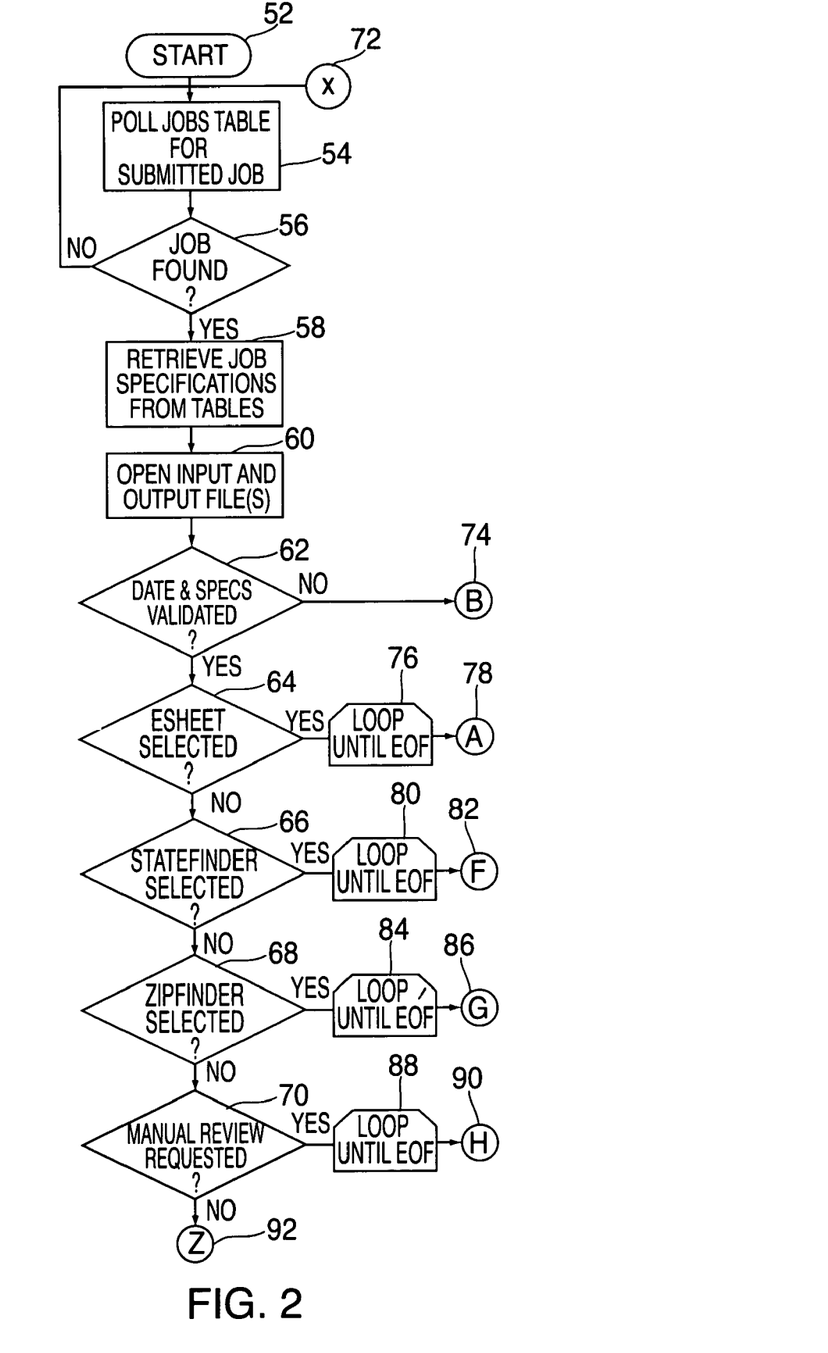

According to the illustrated embodiment, jobs can be run individually or in batches. FIG. 2 illustrates the main program path for job processing. Starting at 52, the jobs table is polled at 54. If a job is found at 56, the job specifications are retrieved at 58, input and output files are opened at 60, and the input data and specifications are validated at 62. If the data and specifications are valid, it is sequentially determined which of four services have been selected: escheat processing at 64, state finder at 66, zip code finder at 68, and manual review at 70.

Figure 9:
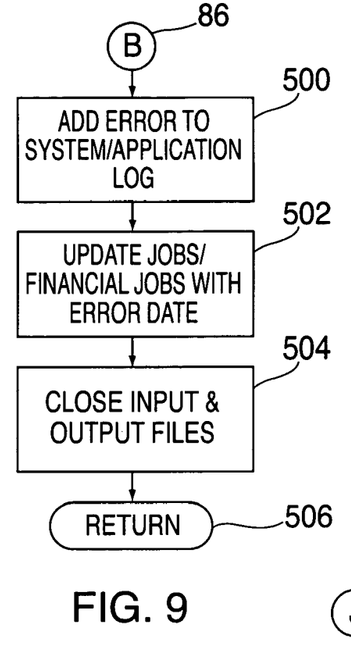
Figure 10:
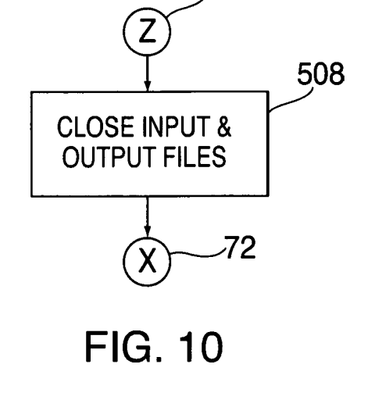

If the data and/or specifications were determined to be invalid at 62, the program proceeds to routine B at 74 which is described in more detail in FIG. 9.

Turning briefly to FIG. 9, an error is logged at 500, the jobs tables are updated with an error date at 502, and the input and output files are closed at 504 before returning to the main program at 506.

Returning now to FIG. 2, if it is determined at 64 that the specifications call for escheat processing, a loop until end of file is begun at 76 and routine A is called at 78. Routine A is illustrated in FIG. 3.

Figures 3, 3A:
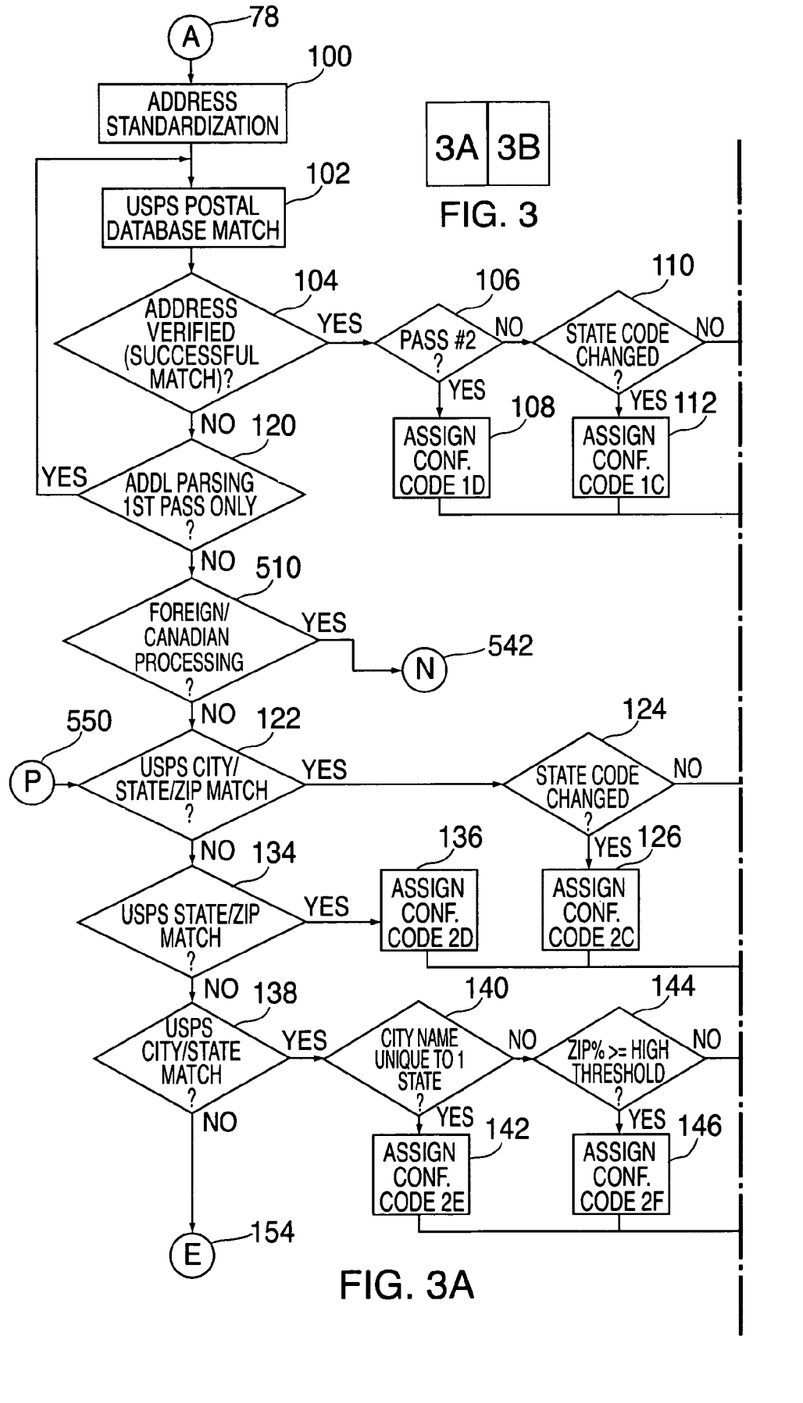
Figure 3B:
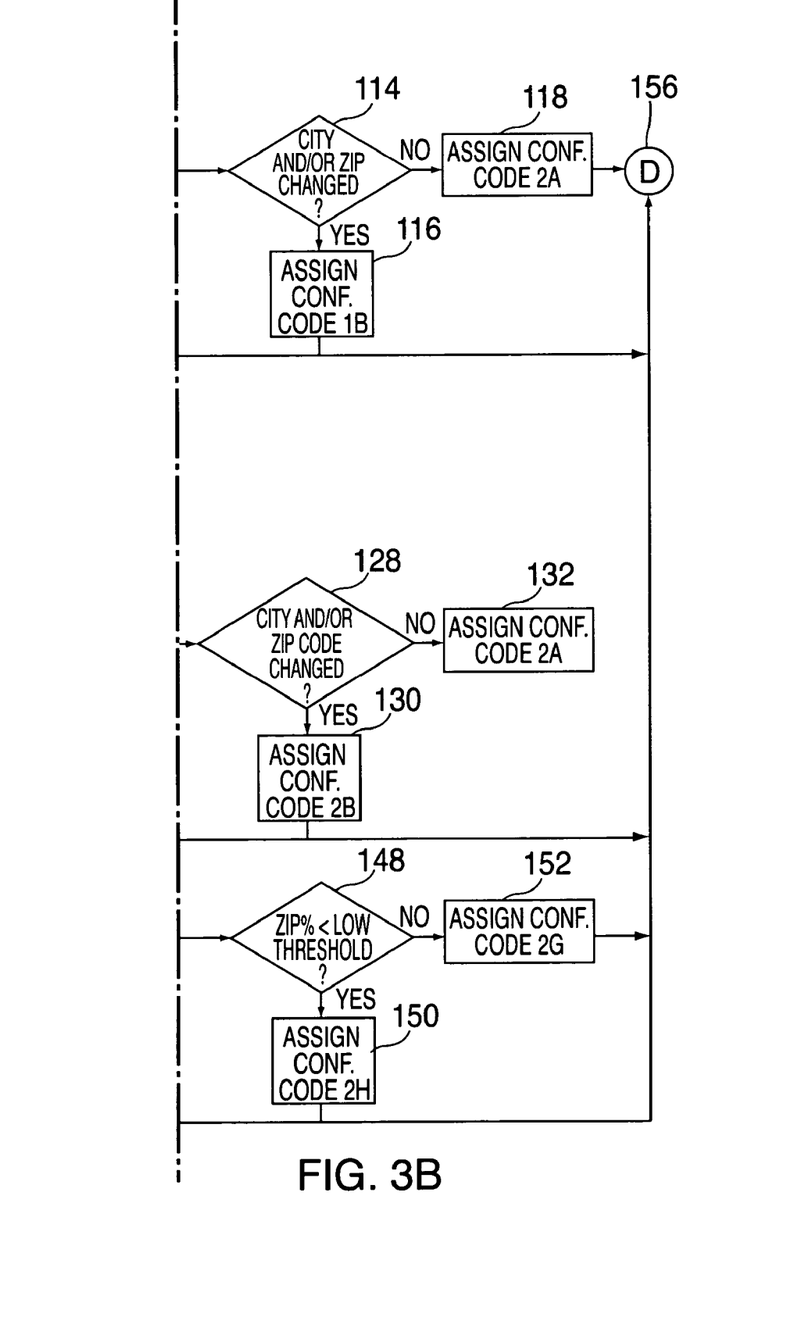

Turning now to FIG. 3, each address is first standardized in format at 100 and then matched to the United States Postal Service (USPS) at 102 using the USPS Coding Accuracy and Support System (CASS) certified address verification software. This software, in addition to matching input addresses to database addresses will correct an input address, if possible, to make all of its elements consistent. For example, if the raw data included "75 Corporate Dr", "Hauppauge", "NM", "1788", then the system can change "NM" to "NY", which is a valid state for the provided city name and zip code. However, the system is not able to make such a correction if there is not a valid street address and the city and zip code fields also contained inconsistencies.

If it is determined at 104 that a successful match has been made and it is further determined at 106 that a second pass was not necessary, at 110 that the state code was not changed and at 114 that the city and/or zip code was not changed, a confidence code of 1A is assigned to the address. This is the highest confidence level.

If the state code was determined to be correct on the first pass and only the city and/or zip code needed to be corrected at 114, the address is assigned the confidence code 1B at 116. If the state code needed to be corrected at 110, the address is assigned a confidence code of 1C at 112.

If other elements of the address need to be corrected as indicated by pass #2 at 106 (after additional parsing at 120), the address is assigned confidence code 1D.

If a successful match was not made at 104 and additional parsing was not performed at 120, then at 510 it is determined whether Canadian and/or other Foreign processing has been selected. If Canadian and/or other Foreign processing has been selected the system proceeds to routine N at 542 which is described in more detail in FIG. 13.

Figure 13:
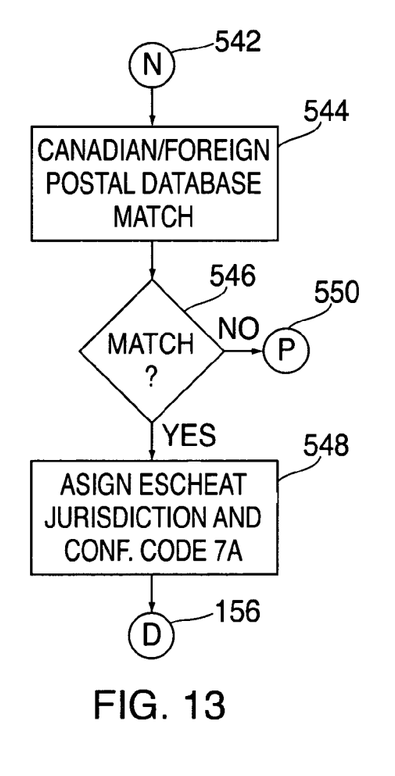

Turning now briefly to FIG. 13, the account is matched to a series of one or more Canadian and/or other Foreign postal databases at 544 to see if all or part of the incoming address can be validated. The match is performed at 546 and if matched, then the appropriate escheat jurisdiction is assigned at 548 along with a confidence code of 7A at which point the program turns to routine D at 156. If no match was found at 546, then the program returns to the main program at P 550 (FIG. 3).

If Canadian/Foreign processing has not been selected at 510, or has been returned to P550 following a non-match, it is determined at 122 whether the city, state and zip code all matched exactly without changing the state code at 124 or the city and/or zip code at 128. If these three address elements were a perfect match, then the address is assigned confidence code 2A at 132. If the city and/or zip code was changed at 128, the address is assigned confidence code 2B at 130. If the state needed to be corrected at 124, the address is assigned confidence code 2C at 126.

If the software was unable to make a three element (city, state, zip code) match, but was able to match state and zip code as determined at 134, the address is assigned confidence level 2D at 136.

If the software was unable to make a two element (state, zip code) match, but was able to match city and state as determined at 138, and if it is determined at 140 that the city name is unique to the state, the address is assigned confidence code 2E at 142. If the city name is not unique to the state, a zip code weighting is performed. In order to assign an escheat state, the state must contain a percentage of the total zip codes in the country that exceeds a user-assigned threshold.

For example, according to the USPS, the city of Denver can be found in 94 zip codes across 11 different states, but Colorado contains 84 of those zip codes, which is just over 89% of the total Denver zip codes in the country. Therefore, if the user assigns a threshold of 89% or less, then the account will be coded for escheatment to Colorado if the account owner's city name is Denver and their state is CO. This process is performed at 144 and the confidence code 2F is assigned to the address. If the state zip code count is below the threshold as determined at 144, it is compared to a lower threshold (e.g. 30 to 49%) at 148. If it is not below that threshold, confidence code 2G is assigned at 152. If it is below that threshold, confidence code 2H is assigned at 150.

Figure 4:
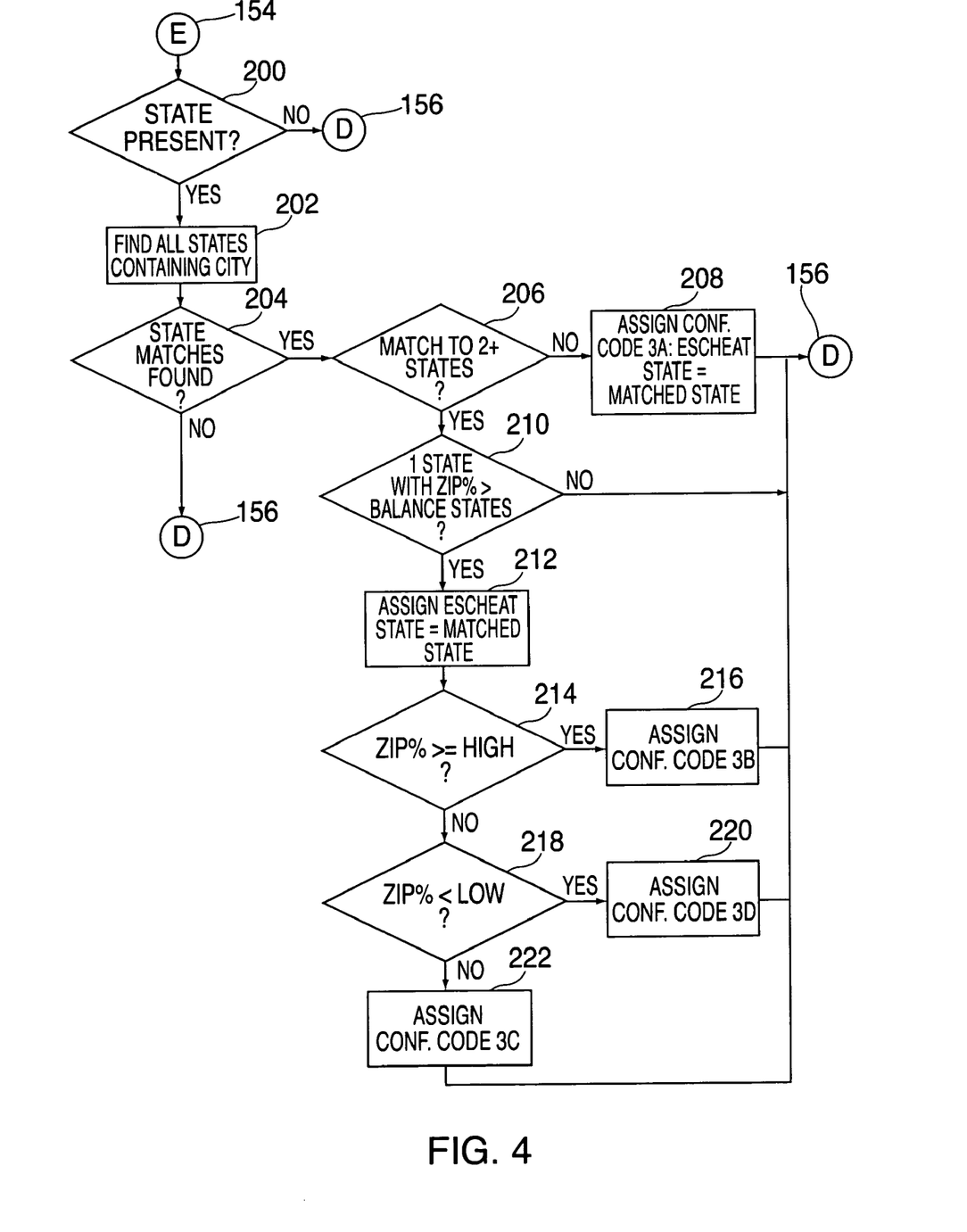

If the match at 138 fails, the program turns to subroutine E at 154. This subroutine is illustrated in FIG. 4. If it is determined at 200 that the address does not include a state (which from prior processing does not match the city), all states containing the city are found at 202. If one or more states are found for the city as determined at 204, and it is determined at 206 that only one state was found, the found state is indicated as the escheat state and confidence code 3A is assigned at 208.

If it is determined at 206 that more than one state matches the city; it is determined at 210 whether one state has more zip codes for the city than any other state. If there is one state that has more zip codes than the others, that state is indicated as the escheat state at 212. The number of zip codes is compared to the previously defined high threshold at 214. If the threshold is exceeded, confidence code 3B is assigned at 216. If the high threshold is not exceeded, the low threshold is tested at 218. If the number of zip codes is not below the low threshold, confidence code 3C is assigned at 222. If it is, confidence code 3D is assigned at 220. Following processing in this subroutine, the program turns to subroutine D at 156. It is important to note that these are all preliminary escheat assignments and that the user's original processing instructions at 22 will determine if the assigned escheat state is accepted or rejected and replaced with the appropriate default state (or province) of the holder's incorporation.

Figures 5, 6:
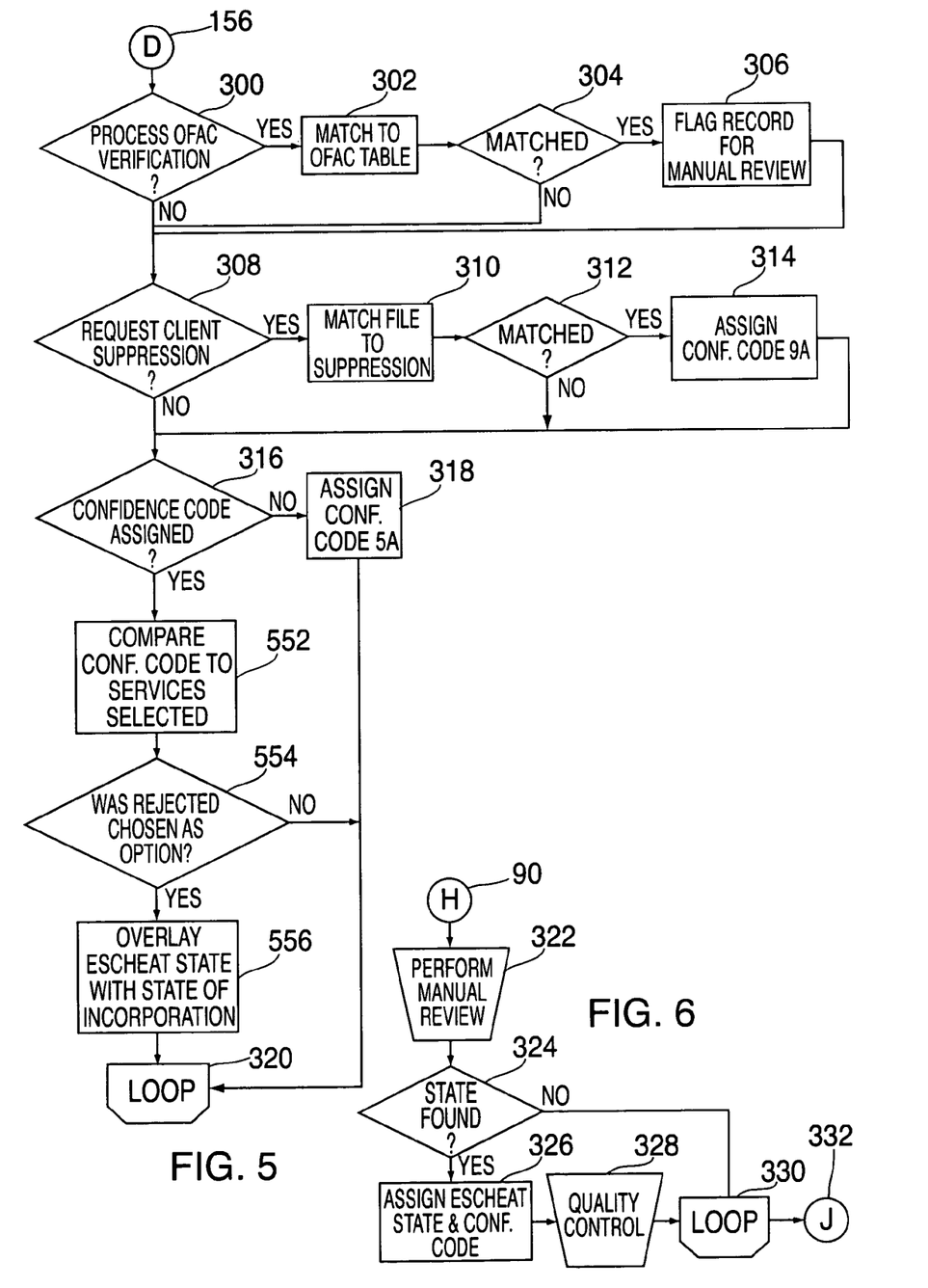

Subroutine D is illustrated in FIG. 5. Starting at 300, it is determined whether the account is to be processed according to the U.S. Treasury Office of Foreign Assets Control (OFAC) guidelines. If it is, the address is compared to an OFAC table at 302. If there is a match as determined at 304, the account is flagged for manual review at 306. By selecting OFAC verification, each client-provided address line is programmatically scanned for the presence of the OFAC restricted foreign countries and/or terrorists, international narcotics traffickers, and those engaged in activities related to the proliferation of weapons of mass destruction. As an additional quality assurance measure, this interrogation is non-case sensitive and does not require leading or trailing spaces. Each matching account is then manually reviewed and only those that are believed to truly be potential OFAC accounts are assigned confidence code 8A (not shown in the Figures) in addition to a state code of "OF". The balance of the matching records retain their original confidence and state codes, but a physical listing of all accounts is provided as a separate report to allow the client to verify these accounts individually.

At 308 it is determined whether a client-provided suppression file should be applied to the address. If it is, matching is performed at 310 and if a match is determined at 312, confidence code 9A is assigned at 314. At 316 it is determined whether no confidence code has been assigned. If no code was assigned, code 5A is assigned at 318. The process loops at 320 back to subroutine A 78 (FIG. 3).

Figure 8:
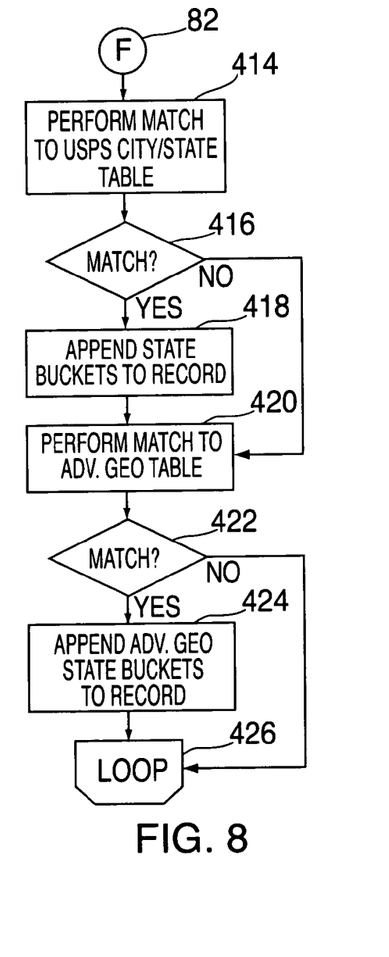

Returning to FIG. 2, the state finder selection 66 invokes subroutine F 82 looping until end of file as indicated by 80. Subroutine F is illustrated in FIG. 8. Starting at 414, the city of the address is compared to the USPS city/state table. If a match is determined at 416, all of the matching states are appended to the record at 418. At 420 the city is matched to an additional table of non-USPS verified city/state listings. If a match is found at 422, all of the matches are appended to the record at 424 and the routine loops at 426 until end of file.

Figure 7:
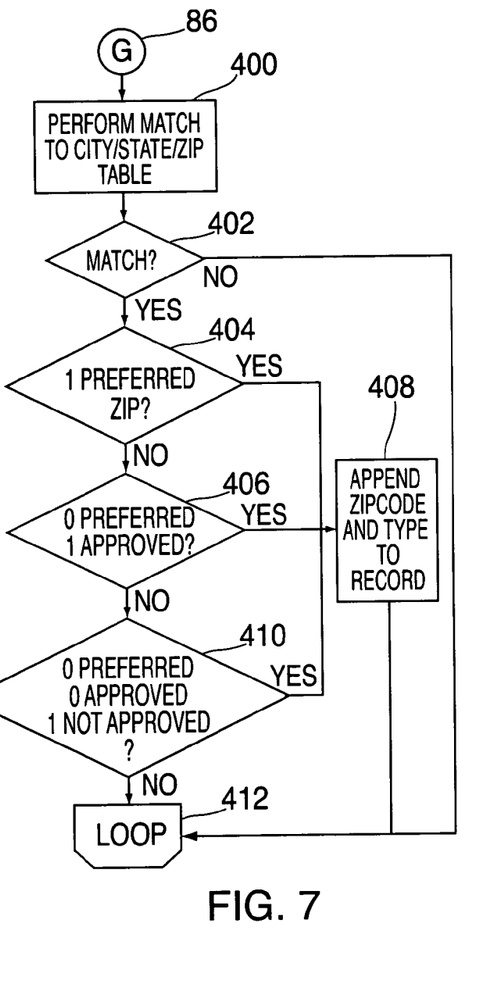

Returning again to FIG. 2, the zip finder selection 68 runs the client file through subroutine G 86 until end of file as indicated by 84. Subroutine G is illustrated in FIG. 7. Starting at 400, the city and state fields of each record are compared to a city/state/zip code table. If a match is determined at 402, it is determined at 404 whether there is one preferred zip code for this city+state combination, at 406 if there is no preferred but one approved, and at 410 if there is only one zip code that is not approved. At 408 the zip code and its type (preferred, approved, not approved) are appended to the record and the process loops at 412 to the next record.

Referring once again to FIG. 2, if the manual review option is selected as determined at 70, subroutine H 90, is invoked to loop to the end of the client's file as indicated by 88. Subroutine H is illustrated in FIG. 6. Manual review is performed at 322. Within the manual review process, judgment calls are made to identify spelling errors (e.g. ASHBURHAM, MA to ASHBURNHAM, MA) and to assign states to recognizable city names (e.g. BOSTON COLLEGE, MO to BOSTON COLLEGE, MA). Typographical errors (e.g. DRAINTREE to BRAINTREE), character transpositions (e.g. COHCITUATE to COCHITUATE), and phonetic errors (e.g. CHICKOPE to CHICOPEE) are detected. Directional abbreviations that were not fully expanded (e.g. S BOSTON to SOUTH BOSTON) are also identified and in some cases decisions are made based upon directionals that weren't recognized by the USPS (e.g. SOUTH HYANNISPORT to HYANNISPORT). Multi-word city names that were concatenated in error (e.g. VANDEUSENVILLE to VAN DEUSENVILLE) are also corrected.

When manually adjusting state assignments, it is more likely to make changes that are in close physical proximity to the provided state, or those whose state acronym is similar, and/or to those that are more distinctive. Because of the subjective nature of this process, there is an error-factor, which is mitigated by having highly trained staff members making these decisions with client oversight as appropriate. When conducting a manual review, there are 3 options, with regard to the level of attention given on average to each account reviewed. Selecting "Normal" will involve a manual review of up to 30 seconds on average per account reviewed. This is adequate time to visually identify the account owner's probable city and state within the encumbered account, as available. Once identified, there is sufficient time to scan through a list of all valid city names for a particular state to see if a substantially similar city name exists, but may not have been identified programmatically for one of the reasons mentioned above. For large blocks of addresses with common unmatched city names, the 30 second window additionally allows for 1-2 separate internet searches using a search engine or website to try to further isolate a valid escheat state. Also, in cases where there is a reasonably large sized block of common city names, additional time may be dedicated to lookup the actual street address within a national USPS postal database.

If, instead of selecting "Normal", the client selects "Comprehensive", then the manual review will average 1-minute per account on average and sometimes longer, depending on the client's specific requirements. As such, this will allow adequate time to conduct a more detailed search on each account as needed.

Selecting "Cursory" will involve a brief review of no more than 10 seconds per account on average. This is adequate time to visually identify and lookup the account owner's city name, but is not sufficient time to do an extended review of any one account.

If after manual review an escheat state is determined at 324, it is assigned with a confidence code at 326. A quality control review is performed at 328 by a second reviewer and the process loops through all of the records at 330. When the process is complete, routine J is called at 332.

Figure 11:
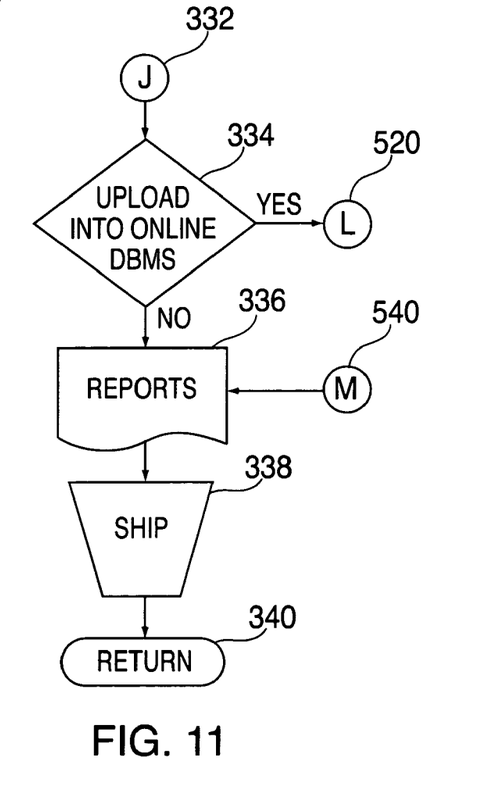

Turning now to FIG. 11, routine J is called at 332. If it was selected to upload the output file into the online DataBase Management System (DBMS) at 334, then routine L is called at 520. If the output file was not selected for upload into the online DBMS at 334, or if the edit period for the online DBMS has expired and returned at M540, then reports are generated at 336 and shipped to the client at 338. The main program is resumed at 340.

Figure 12:
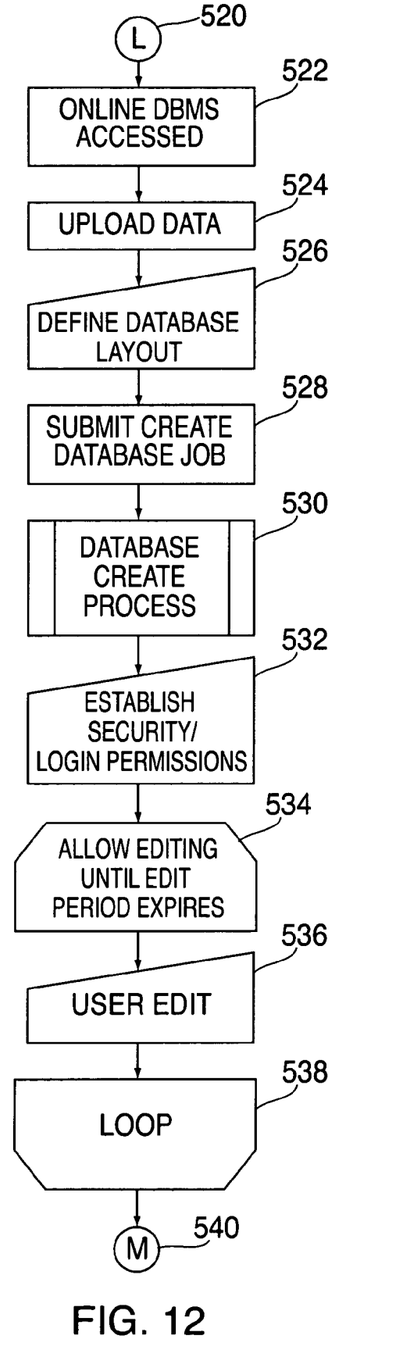

Turning to FIG. 12, if routine L was called at 520, then the online DBMS is accessed at 522, with data uploaded at 524, database layouts being defined at 526, job submitted at 528 and the database creation process taking place at 530. Once the database has been created online, user logon and security permissions are established by an administrator at 532 and an edit period begins whereby users are able to edit the database as per approved guidelines begins at 534, continues through 536 and ends when the edit period expires at 538. The program is resumed in FIG. 11 at 540.

Returning once again to FIG. 2, the last subroutine Z is invoked at 92. This subroutine, shown in FIG. 10, simply closes the input and output files at 508 and exits at 72 where it returns to polling for new jobs (FIG. 2).

According to the presently preferred embodiment of the invention, client data files are filtered so that extraneous account identification information such as "JTWROS", "UGMA", "UTMA". "CUSTODIAN FOR", "CUST FOR", "DECEASED", "IN TRUST FOR", "IN TR FOR"; "ACCOUNT DATED", "ACCT DTD", "JOINT TENANTS", "JT TEN", etc. can optionally be removed from the address record so that it is not mistaken for address information. This information can be removed on a temporary basis only to facilitate the matching process, or it can be additionally removed from the output file in order to produce a data file that is more suitable for mail delivery as per the USPS.

The output files supplied to clients after processing of their account files includes the original data, corrected addresses (optionally), designation of the escheat state, and confidence level. In addition, client reports preferably include a statistical summary of the overall results including the improvements made by the invention in determining the correct escheat state as compared to the original data and an indication of the total value of the accounts improved by the invention, provided account balances are provided to the system. The client may then use the corrected addresses to attempt to contact the property owner before the property escheats to the jurisdiction, or the jurisdictions can use this information to facilitate their review and improve their ability to reunite the assets with their proper owners.

Figure 14:
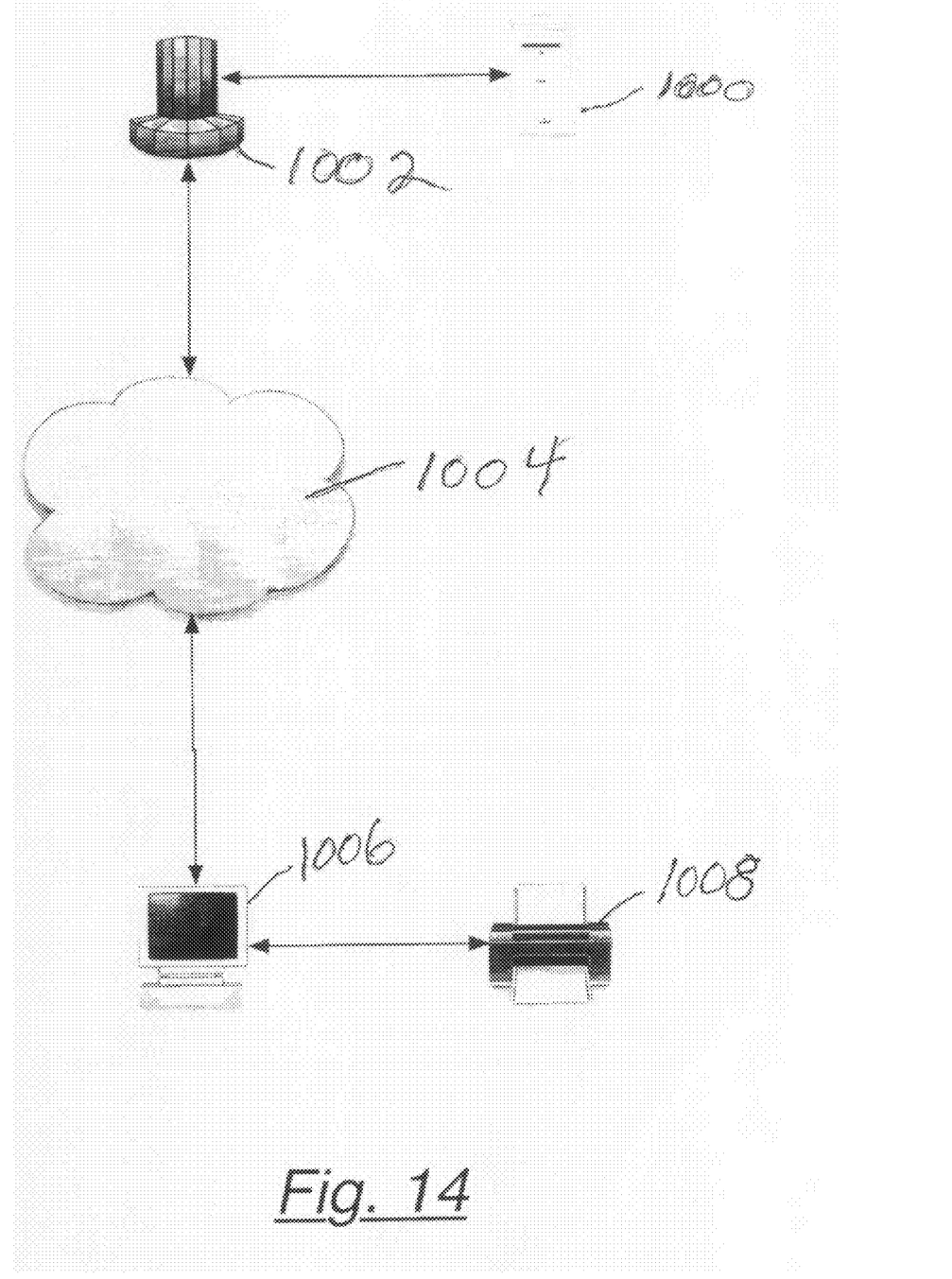
FIG. 14 is a schematic diagram of an apparatus embodying the system of the invention.

Referring now to FIG. 14, an apparatus for implementing the system of the invention includes a database server 1000 which is coupled to a network server 1002. The network server 1002 is coupled to a network 1004, preferably the Internet. The database server 1000 is accessed by a remote user terminal 1006 via the network 1004. A printer 1008 is preferably coupled to the terminal 1006.

There have been described and illustrated herein an abandoned property escheat assignment and reporting system. While a particular embodiment of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as so claimed.

The invention claimed is:

1. A method for determining the correct escheat state for abandoned property, said method comprising:
   inputting a property owner address into a computer having a processor;
   the processor comparing the property owner address, including street address, city, state, and zip code, to a US Postal Service certified data base apparatus;
   the processor assigning a probable escheat state based on the comparison of the property owner addresses with the US Postal Service certified data base apparatus; and
   the processor assigning a confidence code to the escheat state.

2. The method according to claim 1, further comprising:
   the processor making corrections to property owner address based on the comparison.

3. The method according to claim 1, further comprising:
   the processor filtering non-address information from the property owner address prior to said step of comparing.

4. The method according to claim 3, wherein:
   the non-address information includes legal designations of the type of property ownership.

5. The method according to claim 1, further comprising:
   the processor assigning at least one alternate escheat state based on the comparison.

6. The method according to claim 1, further comprising:
   the processor comparing the property owner address to a list of foreign country names; and
   the processor flagging the property owner addresses which include foreign country names that match the list.

7. The method according to claim 1, further comprising:
   the processor comparing the property owner address to a list of non-state location designations.

8. The method according to claim 2, further comprising:
   the processor indicating which addresses were corrected.

9. The method according to claim 8, further comprising:
   the processor indicating the type of correction made.

10. The method according to claim 1, wherein:
    said confidence code represents 100% if the property owner address has an exact match in the US Postal Service certified data base apparatus, and
    said confidence code is based on a ratio of possible matches when an exact match is not found.

11. The method according to claim 10, further comprising:
    the processor correcting the property owner address zip code when city and state are correct but the zip code is incorrect by the comparison.

12. The method according to claim 10, further comprising:
    the processor correcting the property owner address state when the city and zip code are correct but the state is incorrect by the comparison.

13. The method according to claim 10, further comprising:
    the processor correcting the property owner address state when the zip code is incorrect and the state is ambiguous because the city name exists in more than one state, said step of correcting the property owner address state including a statistical analysis by the processor of the number of zip codes for the city in each state having the city.

14. The method according to claim 13, wherein:
    the statistical analysis includes comparison to a user selected high threshold by the processor.

15. The method according to claim 14, wherein:
the statistical analysis includes comparison by the processor to a user selected low threshold.

16. The method according to claim 1, further comprising:
prior to said step of the processor comparing, the processor filtering the property owner addresses based on user supplied suppression data.

17. The method according to claim 1, further comprising:
the processor indicating how the probable escheat state was assigned.

18. The method according to claim 1, further comprising:
the processor generating a report that defines the composition of an abandoned property database and summarizes metrics by the confidence code.

19. The method according to claim 1, wherein:
said method is performed with a computer coupled to the Internet.

20. An apparatus for determining the correct escheat state for abandoned property, said apparatus comprising:
a data base server including means for comparing an uploaded address to a list of addresses stored in a data base;
a network server coupled to said data base server;
a network coupled to the network server;
a remote terminal coupled to the network, said terminal including means for uploading an address to said data base server via said network and said network server; and
a printer coupled to said terminal, wherein said terminal having a terminal processor programmed to upload an address to said data base server, said data base server having a server processor programmed to compare the uploaded addresses to addresses in the data base and said server processor being programmed to download the result of the comparison to said terminal, said terminal processor being programmed to output the results of the comparison to said printer, the results including the indication of an escheat state and a confidence code.

21. The apparatus according to claim 20, wherein:
the data base server corrects the uploaded address based on the comparison.

22. The apparatus according to claim 20, wherein:
the data base server filters non-address information from the uploaded address prior to comparing the uploaded addresses to addresses in the data base.

23. The apparatus according to claim 22, wherein:
the non-address information includes legal designations of the type of property ownership.

24. The apparatus according to claim 20, further comprising:
the data base server assigning at least one alternate escheat state based on the comparison and the results including the at least one alternate escheat state.

25. The apparatus according to claim 20, further comprising:
the data base server comparing the uploaded address to a list of foreign country names; and
the data base server flagging the addresses which include foreign country names that match the list.

26. The apparatus according to claim 20, further comprising:
the data base server comparing the addresses to a list of non-state location designations.

27. The apparatus according to claim 21, further comprising:
the data base server indicating which addresses were corrected.

28. The apparatus according to claim 27, further comprising:
the data base server indicating the type of correction made.

29. The apparatus according to claim 20, wherein:
said confidence code represents 100% if the uploaded address has an exact match in the US Postal Service certified data base, and
said confidence code is based on a ratio of possible matches when an exact match is not found.

30. The apparatus according to claim 20, further comprising:
the data base server correcting the uploaded address zip code when city and state are correct but the zip code is incorrect by the comparison.

31. The apparatus according to claim 20, further comprising:
the data base server correcting the uploaded address state when the city and zip code are correct but the state is incorrect by the comparison.

32. The apparatus according to claim 20, further comprising:
the data base server correcting the uploaded address state when the zip code is incorrect and the state is ambiguous because the city name exists in more than one state, the data base server performing a statistical analysis of the number of zip codes for the city in each state having the city.

33. The apparatus according to claim 32, wherein:
the statistical analysis includes comparison to a user selected high threshold.

34. The apparatus according to claim 33, wherein:
the statistical analysis includes comparison to a user selected low threshold.

35. The apparatus according to claim 20, further comprising:
the data base server filtering the uploaded addresses based on user supplied suppression data.

36. The apparatus according to claim 20, further comprising:
the results indicating how the probable escheat state was assigned.

* * * * *